(12) United States Patent
Nomura

(10) Patent No.: US 8,294,995 B2
(45) Date of Patent: Oct. 23, 2012

(54) LINEAR GUIDE MECHANISM OF LENS BARREL

(75) Inventor: Hiroshi Nomura, Saitama (JP)

(73) Assignee: Hoya Corporation, Tokyo (JP)

( * ) Notice: Subject to any disclaimer, the term of this patent is extended or adjusted under 35 U.S.C. 154(b) by 157 days.

(21) Appl. No.: 12/821,496

(22) Filed: Jun. 23, 2010

(65) Prior Publication Data

US 2010/0328785 A1  Dec. 30, 2010

(30) Foreign Application Priority Data

Jun. 26, 2009 (JP) ................................. 2009-151761

(51) Int. Cl.
*G02B 15/14* (2006.01)
(52) U.S. Cl. ......................... 359/701; 359/700; 359/702
(58) Field of Classification Search .................. 359/699, 359/700, 702
See application file for complete search history.

(56) References Cited

U.S. PATENT DOCUMENTS

| | | | |
|---|---|---|---|
| 5,225,938 A | 7/1993 | Nomura | |
| 5,394,210 A | 2/1995 | Nomura et al. | |
| 5,581,411 A | 12/1996 | Nomura et al. | |
| 5,793,537 A | 8/1998 | Nomura et al. | |
| 5,812,889 A | 9/1998 | Nomura et al. | |
| 5,956,189 A | 9/1999 | Azegami et al. | |
| 5,991,097 A | 11/1999 | Nomura et al. | |
| 6,023,376 A | 2/2000 | Nomura et al. | |
| 6,469,840 B2 | 10/2002 | Nomura et al. | |
| 6,469,841 B2 | 10/2002 | Nomura et al. | |
| 6,707,993 B1 | 3/2004 | Mitani et al. | |
| 6,721,111 B2 | 4/2004 | Nomura et al. | |
| 7,031,604 B2 | 4/2006 | Nomura | |
| 7,085,486 B2 | 8/2006 | Nomura | |
| 7,088,524 B2 * | 8/2006 | Nomura et al. | 359/700 |
| 7,414,802 B2 * | 8/2008 | Noguchi | 359/819 |

FOREIGN PATENT DOCUMENTS

| | | |
|---|---|---|
| JP | 2004-151710 | 5/2004 |
| JP | 2004-184599 | 7/2004 |

* cited by examiner

*Primary Examiner* — Scott J Sugarman
*Assistant Examiner* — Zachary Wilkes
(74) *Attorney, Agent, or Firm* — Greenblum & Bernstein, P.L.C.

(57) ABSTRACT

A linear guide mechanism of a lens barrel, the lens barrel including a rotatable ring, and a linearly movable member which holds an optical element and moves linearly in an optical axis direction by rotation of the rotatable ring, the linear guide mechanism includes a plurality of partial linear guide members which linearly guide the linearly movable member in the optical axis direction. A movement range of the linearly movable member in the optical axis direction is shared by a plurality of different movement ranges, via which the linearly movable member is linearly guided in the optical axis direction by the plurality of partial linear guide members, respectively.

20 Claims, 16 Drawing Sheets

LINEAR GUIDE MECHANISM OF LENS BARREL

BACKGROUND OF THE INVENTION

1. Field of the Invention

The present invention relates to a linear guide mechanism of a lens barrel.

2. Description of the Related Art

In lens barrels such as those for cameras, it is often the case that an optical element holding member which holds an optical element such as a lens group is moved in an optical axis direction by a combination of a linear guide mechanism for guiding the optical element holding member linearly in the optical axis direction and a rotatable ring such as a cam ring. An example of such a lens barrel is disclosed in Japanese Unexamined Patent Publication 2004-151710.

A typical linear guide mechanism of a lens barrel is structured by providing a linear guide member (such as a linear guide ring) with a set of guiding portions such as elongated grooves or guide keys, each of which includes a guide surface extending in an optical axis direction, and by providing a linearly movable member (such as a linearly movable ring) with a corresponding set of slide portions which are in slidable contact with the set of guide surfaces. The maximum amount of movement of the linearly movable member is determined by the length of the set of guide surfaces on the linear guide member, and this length is restricted by the length of the linear guide member in the optical axis direction. Namely, in the related art, it is impossible to make the range of movement of the linearly movable member greater than the length of the linear guide member in the optical axis direction, and accordingly, an enlarged range of movement of the linearly movable member and miniaturization of the linear guide member in the optical axis direction are traded off for each other. For instance, in a zoom lens, if it is attempted to increase the range of movement of each movable lens group in the optical axis direction to achieve a high zoom ratio, the linear guide member for this movable lens group increases in size in the optical axis direction, thus restricting the miniaturization of the lens barrel, especially in the optical axis direction. Conversely, if the linear guide member is small (short) in the optical axis direction, the linearly movable member cannot be made to have a wide range of movement in the optical axis direction.

SUMMARY OF THE INVENTION

The present invention has been devised in view of the above described problems and provides a linear guide mechanism of a lens barrel which makes it possible to allow a wide range of movement of the linearly movable member, in the optical axis direction, while achieving miniaturization in size of the linear guide member in the optical axis direction.

Focusing on the fact that a plurality of irrotational members exists in a lens barrel, the present invention has been devised based on the idea that the range of movement of the linearly movable member can be set without being restricted by the length of each linear guide member in the optical axis direction by configuring the linear guide mechanism over the plurality of irrotational members. According to an aspect of the present invention, a linear guide mechanism of a lens barrel is provided, the lens barrel including a rotatable ring, and a linearly movable member which holds an optical element and moves linearly in an optical axis direction by rotation of the rotatable ring, the linear guide mechanism including a plurality of partial linear guide members which linearly guide the linearly movable member in the optical axis direction. A movement range of the linearly movable member in the optical axis direction is shared by a plurality of different movement ranges, via which the linearly movable member is linearly guided in the optical axis direction by the plurality of partial linear guide members, respectively.

It is desirable for the plurality of partial linear guide members to include a first partial linear guide member, which guides the linearly movable member linearly in the optical axis direction when the lens barrel is in a ready-to-photograph state; and a second partial linear guide member, which guides the linearly movable member linearly in the optical axis direction when the lens barrel is in a lens barrel accommodated state in which no picture taking operation is performed. During a transition of the lens barrel from the lens barrel accommodated state to the ready-to-photograph state, a linear guiding operation of the second partial linear guide member for the linearly movable member is canceled and a linear guiding operation of the first partial linear guide member for the linearly movable member commences.

When the lens barrel moves from the lens barrel accommodated state to the ready-to-photograph state, it is desirable for the linear guiding operation of the first partial linear guide member for the linearly movable member to commence before the linear guiding operation of the second partial linear guide member for the linearly movable member is canceled.

It is desirable for the optical element to serve as an element of a zoom lens optical system, and for the first partial linear guide member to guide the linearly movable member linearly in the optical axis direction over an entire zooming range from a wide-angle extremity to a telephoto extremity of the zoom lens optical system.

In this manner, by making a single linear guide member undertake the linear guidance of the linearly movable member in the optical axis direction in a ready-to-photograph state (over the entire zooming range) at all times, the optical element can be guided in the optical axis direction with high precision.

It is desirable for the rotatable ring to include a cam ring provided with a first cam groove and a second cam groove which have mutually different cam profiles. The linearly movable member includes a cam follower which is engaged in the first cam groove of the cam ring. The first partial linear guide member is coupled to the cam ring in a manner to be prevented from moving relative to the cam ring in the optical axis direction and to allow the cam ring to rotate relative to the first partial linear guide member. The second partial linear guide member holds another optical element which is different from the optical element that the linearly movable member holds. The second partial linear guide member includes a cam follower which is engaged in the second cam groove of the cam ring so that the second partial linear guide member is moved linearly in the optical axis direction in a moving manner different from that of the first partial linear guide member in accordance with a rotation of the cam ring.

It is desirable for the cam ring to advance in the optical axis direction while rotating relative to a stationary barrel when the lens barrel moves from the lens barrel accommodated state to the ready-to-photograph state, and for the first partial linear guide member to be guided linearly in the optical axis direction by a linear guide provided on the stationary barrel.

It is desirable for the linear guide mechanism to include an intermediate linear guide member which is guided linearly in the optical axis direction by a linear guide provided on a stationary barrel, and for the second partial linear guide member to be guided linearly in the optical axis direction by the intermediate linear guide member.

It is desirable for the linearly movable member and the first partial linear guide member to be provided as two external barrels of the lens barrel, respectively, one of which is positioned over the other. An amount of overlap between the two external barrels varies in accordance with the rotation of the cam ring.

It is desirable for each of the plurality of partial linear guide members to include a linear guide groove, at least one end of which in the optical axis direction is formed as an open end, and for the linearly movable member to include a plurality of kinds of linear guide keys which are engaged in and disengaged from respective linear guide grooves of respective partial linear guide members via respective open ends.

It is desirable for at least one of the open ends of the linear guide grooves to be shaped into a flared opening, the width of which gradually increases.

It is desirable for at least one of the linear guide keys to include a tapered insertion end for inserting into the open end of associated one of the linear guide grooves.

It is desirable for the plurality of partial linear guide members and the linearly movable member to be concentrically arranged about the optical axis.

According to the present invention, since it is possible to give the linearly movable member a range of movement in the optical axis direction which is greater than the length of each partial linear guide member in the optical axis direction, a lens barrel capable of giving the linearly movable member a wide range of movement in the optical axis direction while achieving a reduction in size of the linear guide member in the optical axis direction is achieved.

The present disclosure relates to subject matter contained in Japanese Patent Application No. 2009-151761 (filed on Jun. 26, 2009) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
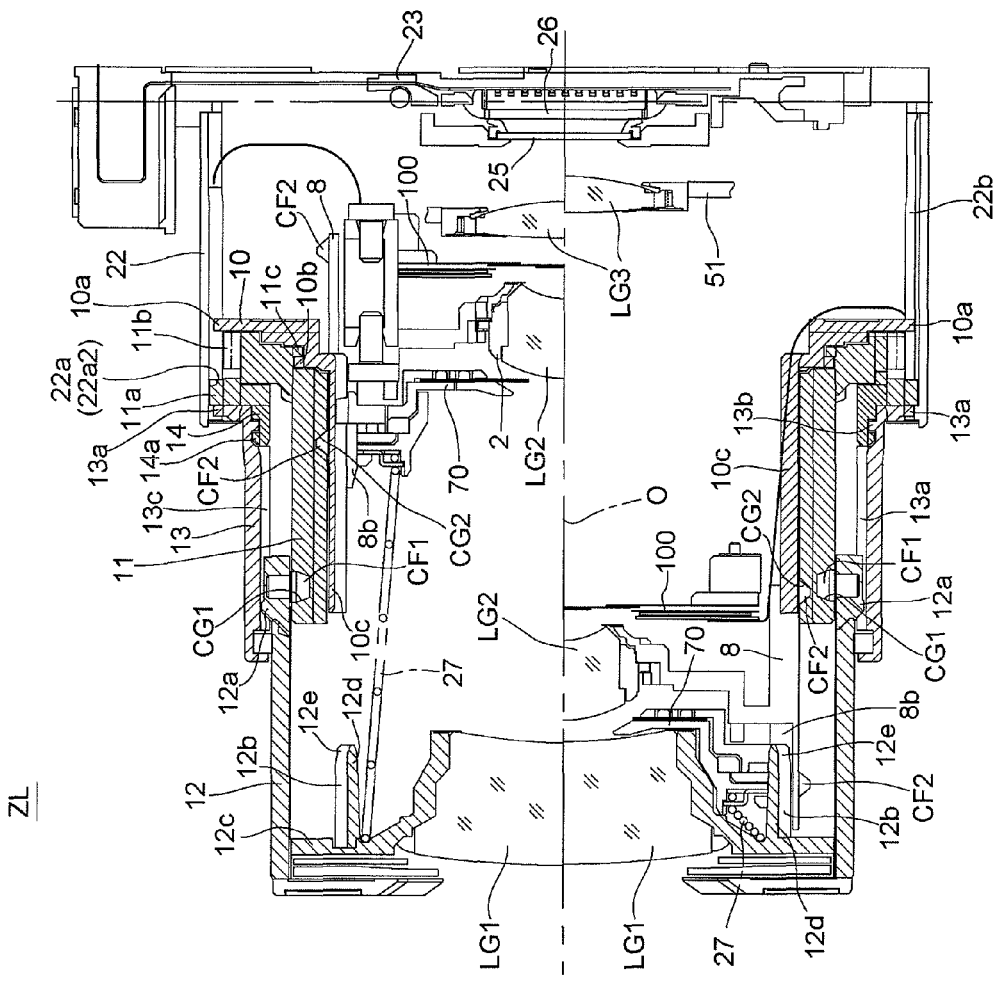
FIG. 1 is a cross sectional view of an embodiment of a zoom lens barrel of a compact digital camera, according to the present invention, in a ready-to-photograph state within the zooming range (more specifically, the upper half and the lower half of the zoom lens barrel show the zoom lens barrel set at the wide-angle extremity and the telephoto extremity, respectively)
Figure 2:
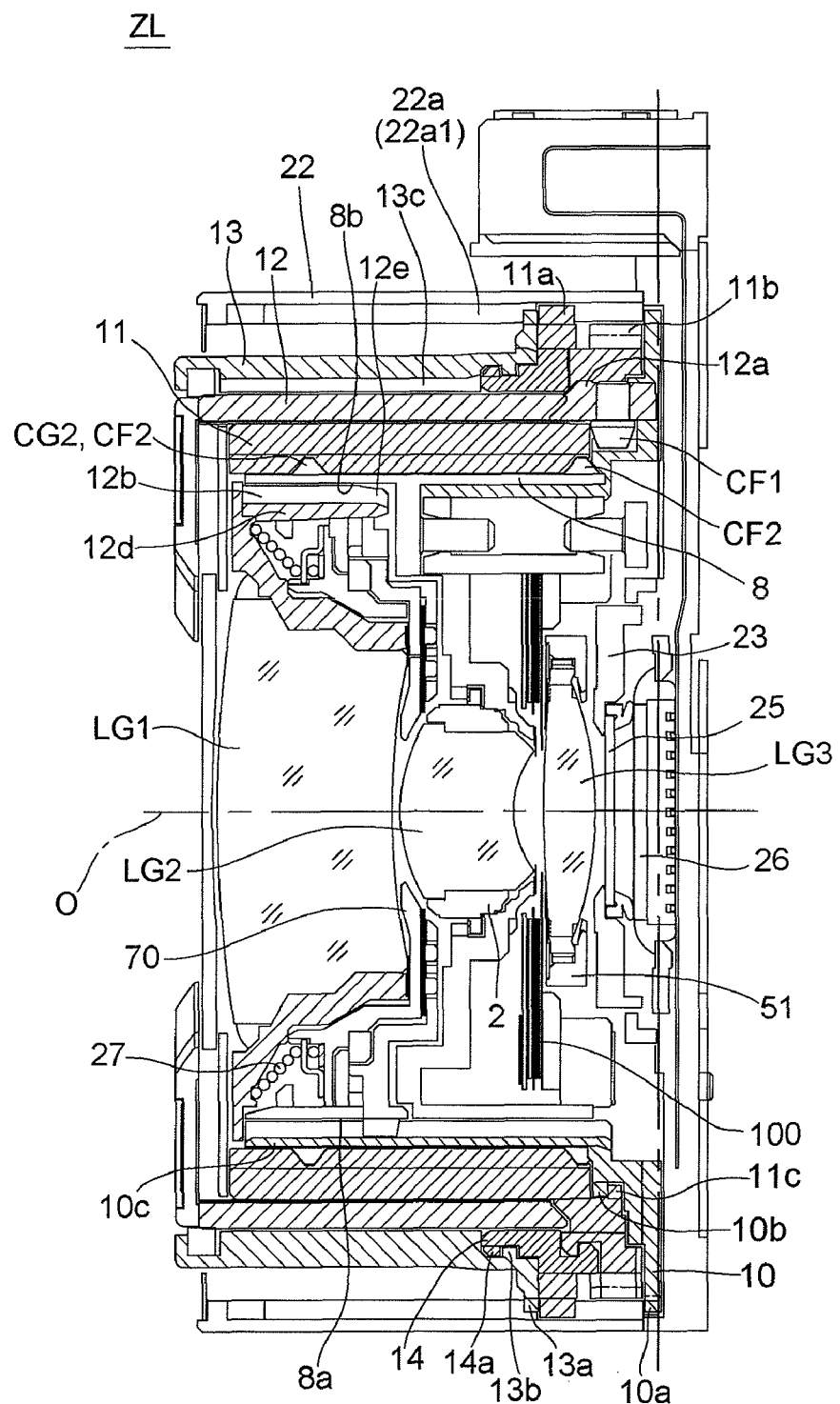
FIG. 2 is a cross sectional view of the zoom lens barrel in a lens barrel accommodated state (fully retracted state)

FIGS. 1 and 2 show an embodiment of a zoom lens barrel (zoom lens) ZL having a linear guide mechanism according to the present invention. A photographing optical system installed in the zoom lens barrel ZL is provided with a first lens group (optical element) LG1, a second lens group (optical element) LG2, a third lens group (focusing lens group) LG3, a low-pass filter (optical filter) 25 and an image sensor (image pickup device) 26, in that order from the object side. In the following descriptions, the optical axis direction refers to a direction along or parallel to an optical axis O of this photographing optical system, the front and the rear/behind refer to the object side and the image side, respectively; and the forward and rearward directions refer to the forward and rearward directions in the optical axis direction, respectively.

The low-pass filter 25 and the image sensor 26 are integrated as a single unit that is fixed to an image sensor holder 23, and the image sensor holder 23 is fixed to the back of a housing (stationary barrel) 22 of the zoom lens barrel ZL.

The zoom lens barrel ZL is provided with a third lens group frame 51 which holds the third lens group LG3. The third lens group frame 51 is supported by the housing 22 to be movable in the optical axis direction relative to the housing 22. The third lens group frame 51 is driven by an AF motor 160 that is supported by the housing 22 (see FIG. 3).

Figure 3:
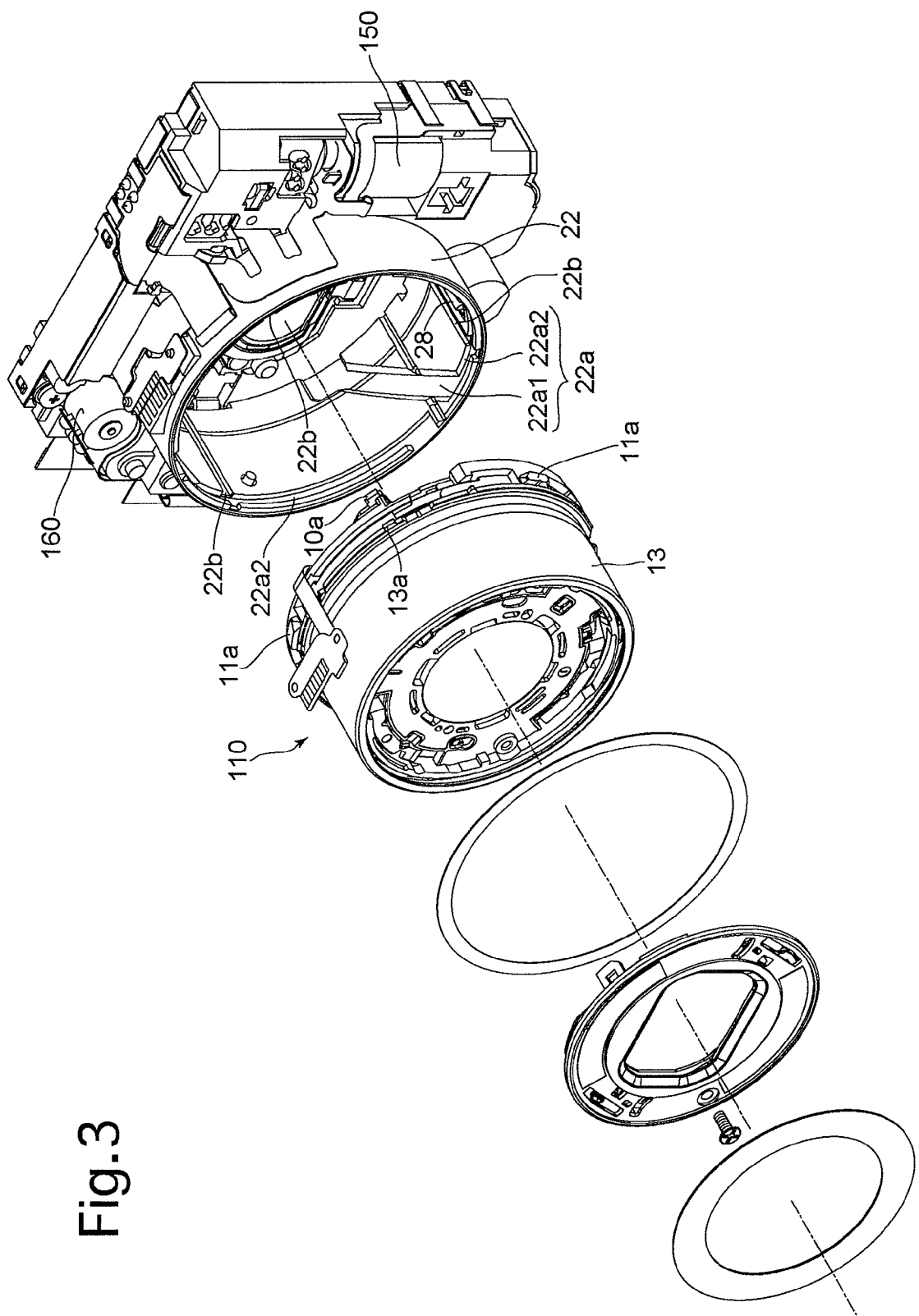
FIG. 3 is an exploded front perspective view of elements of the zoom lens barrel with a movable lens unit being removed from a housing of the zoom lens barrel.
Figure 4:
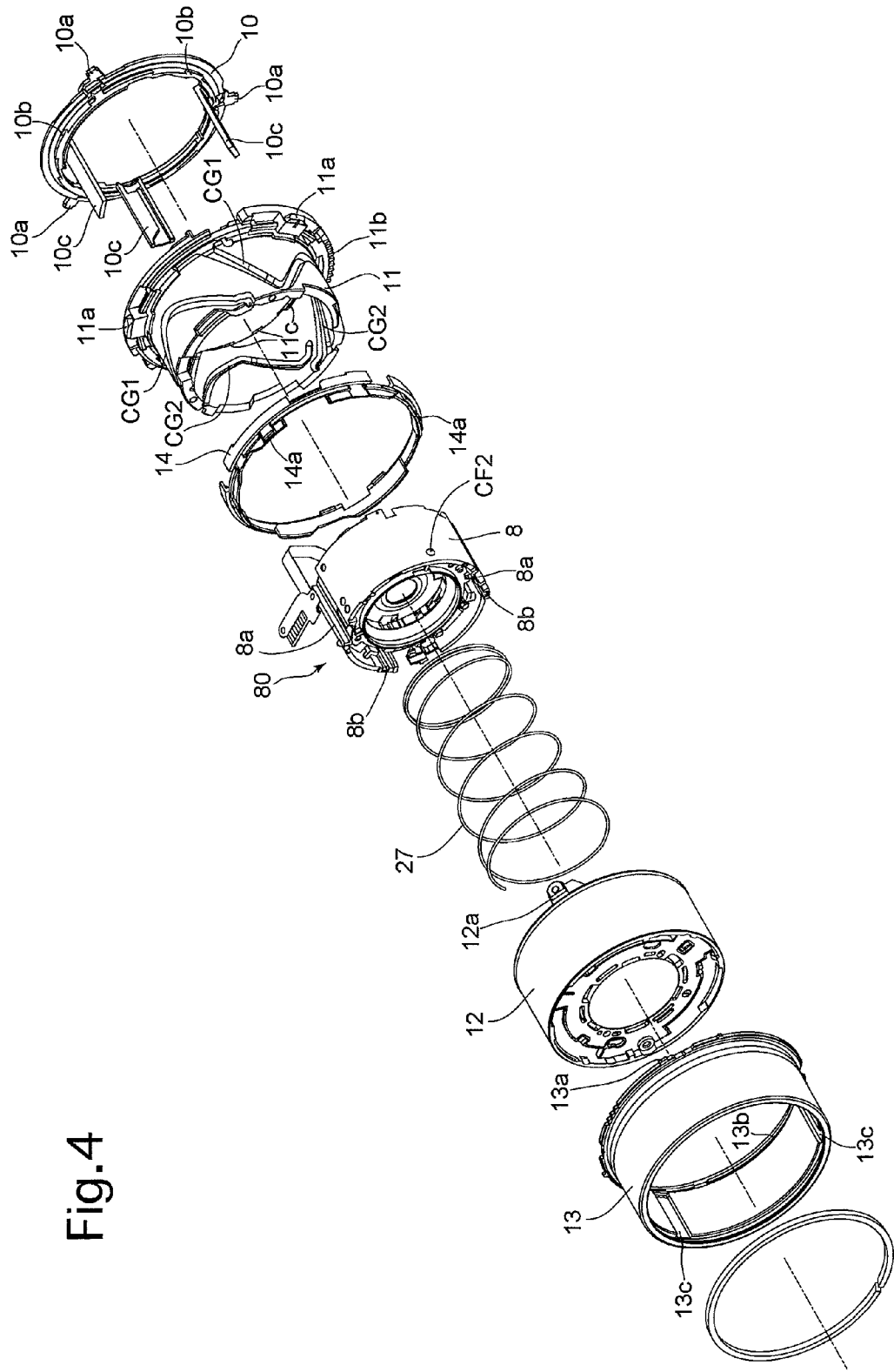
FIG. 4 is an exploded front perspective view of the movable lens unit.

As shown in FIG. 3, the zoom lens barrel ZL is provided inside the housing 22 with a movable lens unit (cam-ring-incorporated movable unit) 110 which is supported by the housing 22 to be movable in the optical axis direction. As shown in FIG. 4, the movable lens unit 110 is provided with a linear guide ring (intermediate linear guide member) 10 for linearly guiding the second lens group LG2, a cam ring (rotatable ring) 11, a second advancing barrel (linearly movable member) 12, a first advancing barrel (partial linear guide member) 13, a cam-ring connecting ring 14 and a second lens group holding unit 80. The second advancing barrel 12 and the first advancing barrel 13 constitute two advancing/retracting external barrels, of the telescoping type of zoom lens barrel ZL, one of which is slidably fitted on the other; the amount of overlap between the second advancing barrel 12 and the first advancing barrel 13 in the optical axis direction varies in accordance with rotation of the cam ring 11 (the detailed structure of which will be discussed later).

The cam ring 11 is provided with a plurality of guide projections 11a which are slidably engaged in a plurality of cam-ring guide grooves 22a formed on an inner peripheral surface of the housing 22. As shown in FIG. 3, each cam-ring guide groove 22a is provided with a lead groove portion 22a1 and a semi-circumferential groove portion 22a2. The semi-circumferential groove portions 22a2 of the set of three cam-ring guide grooves 22a lie in a plane orthogonal to the optical axis O to define a discontinuous annular groove about the optical axis O. Each lead groove portion 22a1 is inclined with respect to the optical axis direction, and each semi-circumferential groove portion 22a2 extends in a circumferential direction about the optical axis O and is communicatively connected at one circumferential end thereof to the front end of a corresponding lead groove portion 22a1.

The zoom lens barrel ZL is provided with a zoom motor 150 (FIG. 3) mounted to the housing 22, and is further provided inside the housing 22 with a zoom gear 28 (partly shown in FIG. 3) which is elongated in the optical axis direction and driven to rotate by the zoom motor 150. The zoom gear 28 is engaged with an outer peripheral gear 11b formed at a rear end of the cam ring 11. The zoom gear 28 is rotated by the driving force of the zoom motor 150. Accordingly, the cam ring 11 is rotated by the driving force of the zoom motor 150 via the engagement of the zoom gear 28 with the outer peripheral gear 11b, and this rotation of the cam ring 11 causes the cam ring 11 to move in the optical axis direction while rotating while being guided by the plurality of guide projections 11a and the lead groove portions 22a1 of the plurality of cam-ring guide grooves 22a in the advancing/retracting operational range of the zoom lens barrel ZL between the accommodated position (shown in FIG. 2) and the zooming range (shown in FIG. 1). When the zoom lens barrel ZL is in the zooming range (as shown in FIG. 1), the cam ring 11 rotates at a fixed position in the optical axis direction while being guided by the plurality of guide projections 11a and the semi-circumferential groove portions 22a2 of the plurality of cam-ring guide grooves 22a.

The cam ring 11 is fixedly coupled to the cam-ring connecting ring 14. The first advancing barrel 13 is positioned outside the cam ring 11 and the cam-ring connecting ring 14, and the linear guide ring 10 is positioned inside the cam ring 11 and the cam-ring connecting ring 14. The housing 22 is provided on an inner peripheral surface thereof with three linear guide grooves (linear guide) 22b (see FIG. 3) which extend parallel with each other in the optical axis direction. The linear guide ring 10 is provided with three linear guide projections 10a which project radially outwards to be slidably engaged in the linear guide grooves 22b, respectively, to be guided linearly in the optical axis direction relative to the housing 22, and the first advancing barrel 13 is provided with three linear guide projections 13a which project radially outwards to be slidably engaged in the linear guide grooves 22b, respectively, to be guided linearly in the optical axis direction relative to the housing 22. The linear guide ring 10 is provided with a plurality of rotational guide prongs 10b which project radially outwards to be slidably engaged with a plurality of rotational guide prongs 11c which project radially inwards from an inner peripheral surface of the cam ring 11 in the vicinity of the rear end thereof. The linear guide ring 10 is coupled (bayonet-coupled) to the cam ring 11 via this engagement between the plurality of rotational guide prongs 10b and the plurality of rotational guide prongs 11c to allow the cam ring 11 to rotate relative to the linear guide ring 10 and to move integrally with the cam ring 11 in the optical axis direction (i.e., to be prevented from moving relative to the cam ring 11 in the optical axis direction). The cam-ring connecting ring 14 is provided on an outer peripheral surface thereof with a plurality of rotational guide prongs 14a which project radially outwards to be slidably engaged with a plurality of rotational guide prongs 13b which project radially inwards from an inner peripheral surface of the first advancing barrel 13 at the rear end thereof. The first advancing barrel 13 is coupled (bayonet-coupled) to the cam-ring connecting ring 14 via this engagement between the plurality of rotational guide prongs 14a and the plurality of rotational guide prongs 13b to allow the cam-ring connecting ring 14 (and the cam ring 11) to rotate relative to the first advancing barrel 13 and to move integrally with the cam-ring connecting ring 14 (and the cam ring 11) in the optical axis direction (i.e., to be prevented from moving relative to the cam ring 11 and the cam-ring connecting ring 14 in the optical axis direction). Accordingly, the relationship among the linear guide ring 10, the cam ring 11 and the first advancing barrel 13 is such that the linear guide ring 10, the cam ring 11 and the first advancing barrel 13 move together in the optical axis direction, and is such that the cam ring 11 is rotatable relative to each of the linear guide ring 10 and the first advancing barrel 13 that are guided linearly in the optical axis direction relative to the housing 22.

Figure 8:
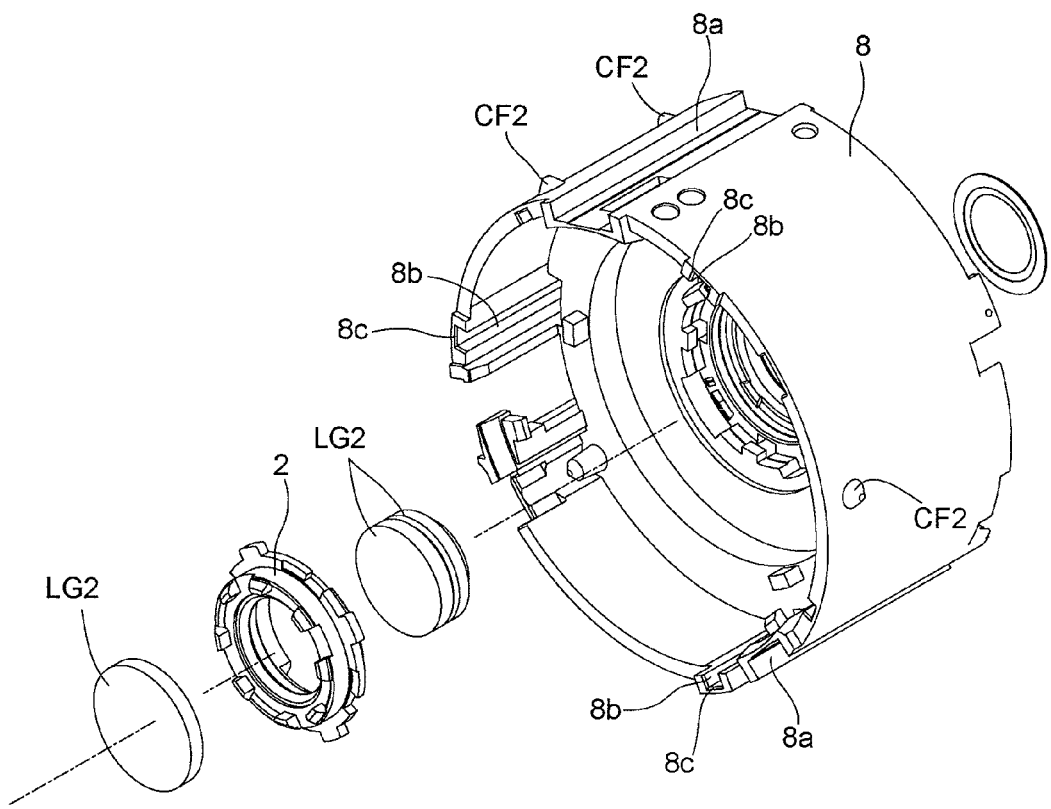
FIG. 8 is a front exploded perspective view of elements of the zoom lens barrel, showing a second lens group moving frame and a second lens group supported thereby.

The linear guide ring 10 guides the second lens group holding unit 80 (see FIG. 4) linearly in the optical axis direction via three linear guide bars 10c that extend forward in the optical axis direction so that the second lens group holding unit 80 can move in the optical axis direction relative to the linear guide ring 10. The second lens group holding unit 80 is provided with a second lens group moving frame (partial linear guide member) 8, as shown in FIG. 8, and is provided inside the second lens group moving frame 8 with a second lens group holding frame 2 which holds the second lens group LG2. The second lens group holding unit 80 is guided linearly in the optical axis direction by the slidable engagement of the linear guide bars 10c in three linear guide grooves 8a which are formed on the second lens group moving frame 8 to extend in the optical axis direction. The second lens group holding unit 80 is provided, in front of and behind the second lens group holding frame 2, with a variable aperture-stop mechanism 70 and a shutter unit 100, respectively, each of which is supported by the second lens group moving frame 8 to be movable in the optical axis direction relative to the second lens group moving frame 8 (see FIGS. 1 and 2).

Figure 5:
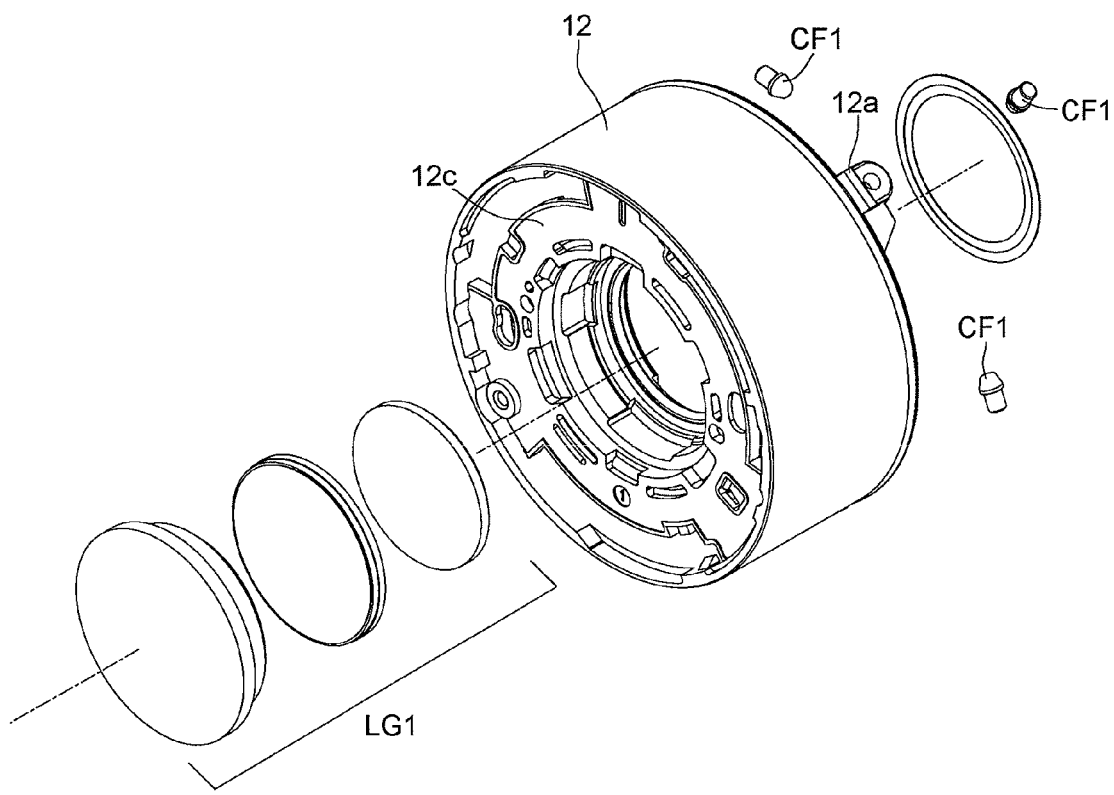
FIG. 5 is an exploded front perspective view of elements of the zoom lens barrel, showing a second advancing barrel and a first lens group supported thereby.
Figure 6:
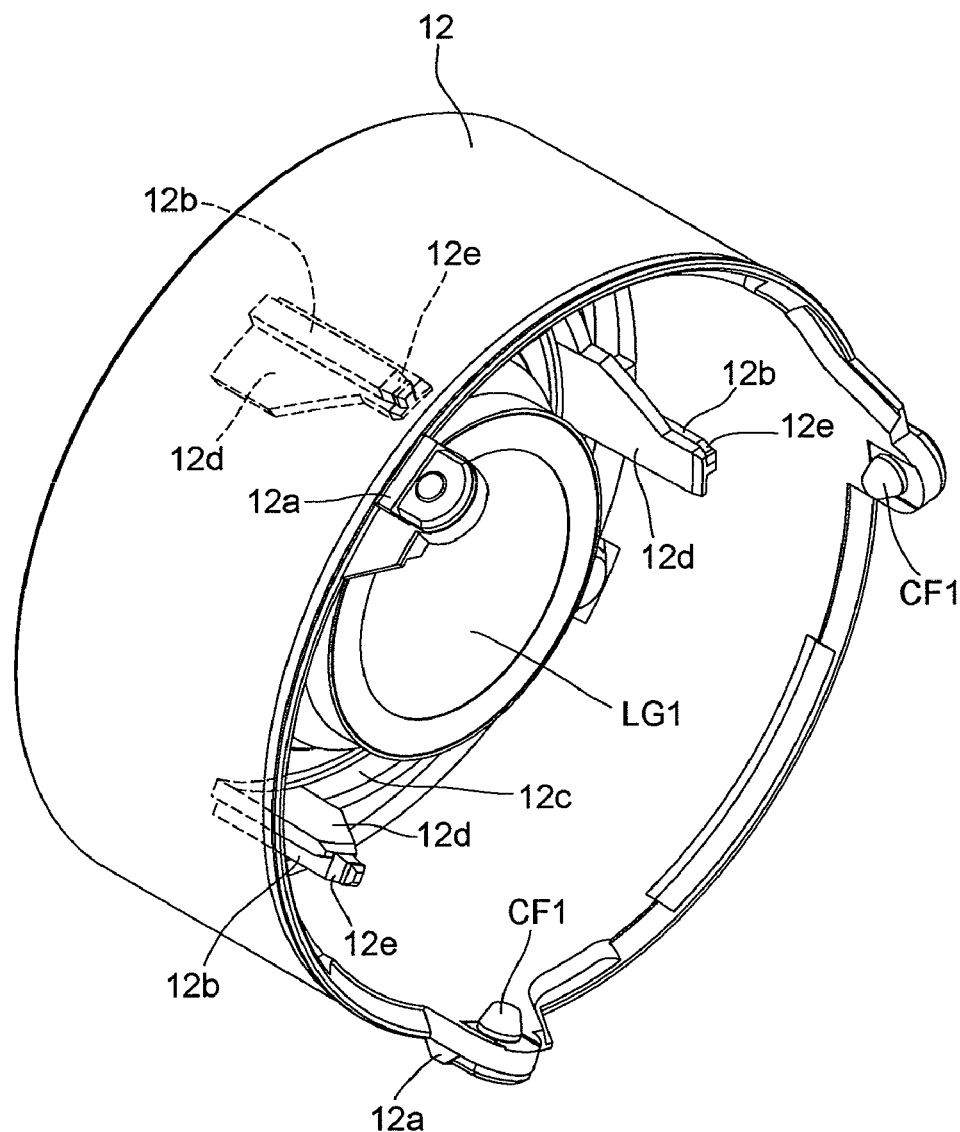
FIG. 6 is rear perspective view of the second advancing barrel.
Figure 9:
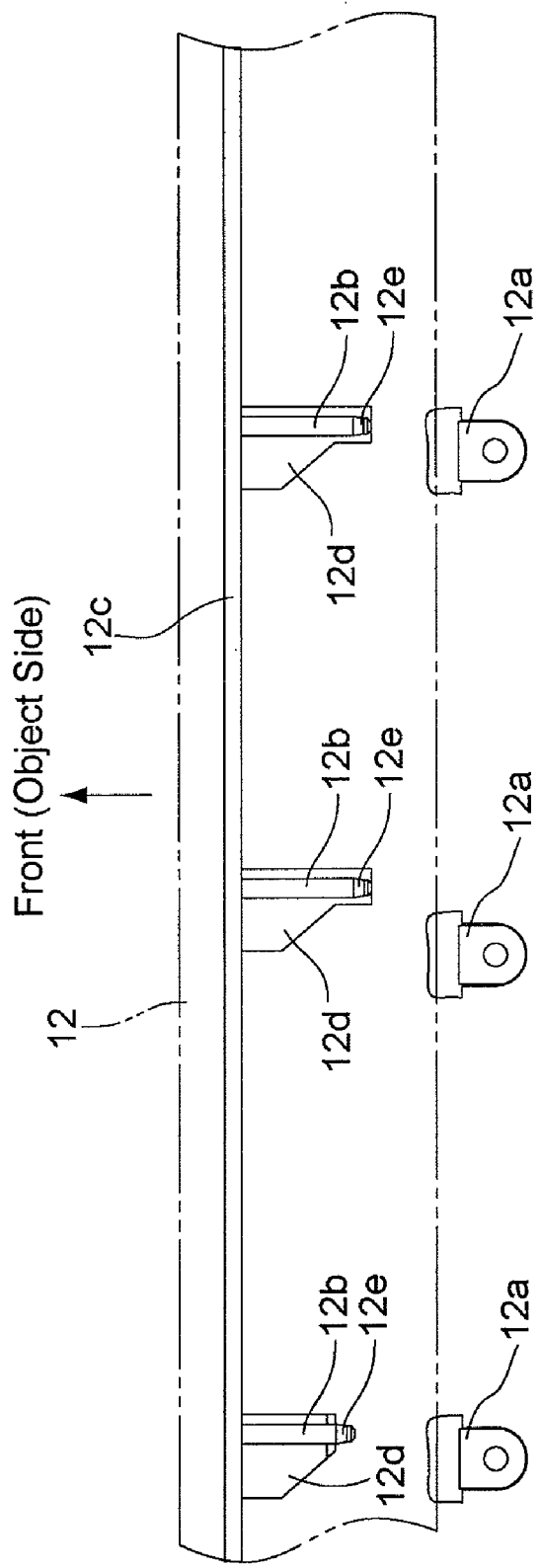
FIG. 9 is a developed view, partly transparent, of the second advancing barrel.

The second advancing barrel 12, which supports the first lens group LG1, is guided linearly in the optical axis direction by two members: the first advancing barrel 13 and the second lens group moving frame 8. As shown in FIGS. 5, 6 and 9, the second advancing barrel 12 is provided, in the vicinity of the rear end thereof at substantially equi-angular intervals in the circumferential direction thereof, with three outer linear guide keys 12a; and further provided, at substantially equi-angular intervals in the circumferential direction thereof, with three inner linear guide keys 12b. The second advancing barrel 12 is provided on an inner peripheral surface thereof with an annular flange 12c which extends radially inwards, the inner periphery of which holds the first lens group LG1. The second advancing barrel 12 is provided with three rearward projecting lugs 12d which project rearward in the optical axis direction from the annular flange 12c, and the inner linear guide keys 12b are formed on outer peripheral surfaces of the rearward projecting lugs 12d, respectively (see FIGS. 6, 15 and 16). The rear end of each inner linear guide key 12b in the optical axis direction is shaped into a tapered end (tapered insertion end) 12e which tapers rearwardly (i.e., the width of which reduces in the rearward direction).

Figure 7:
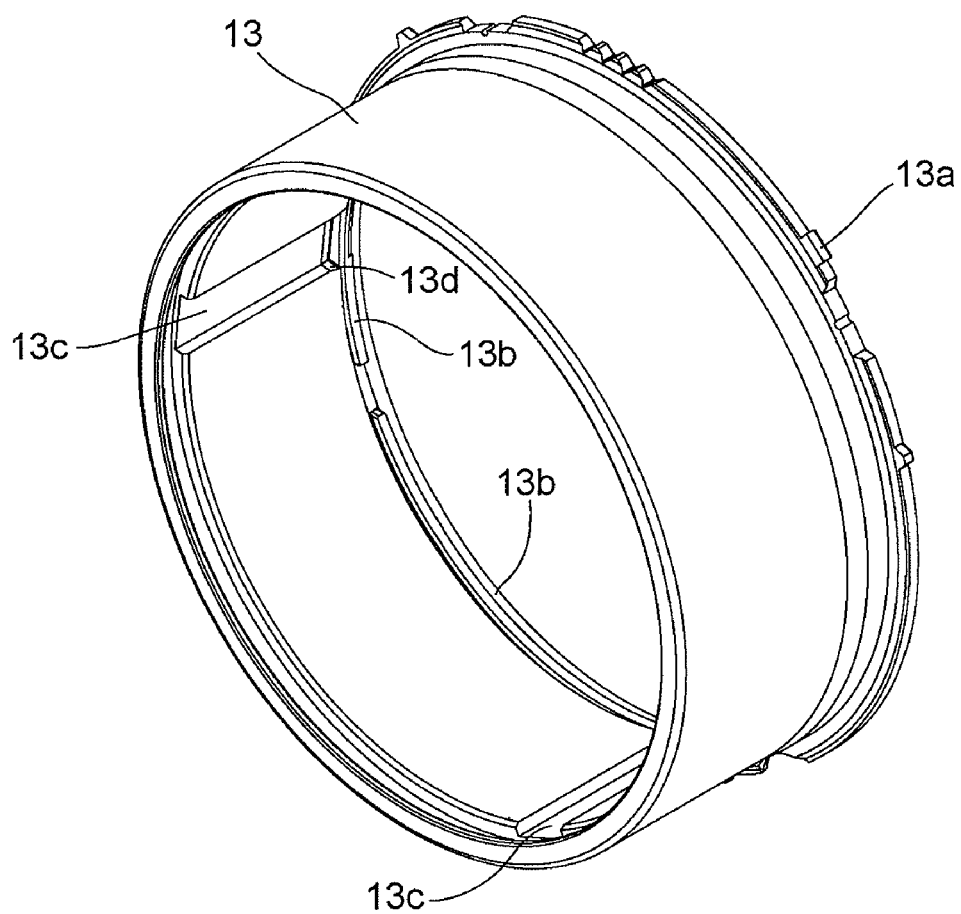
FIG. 7 is a front perspective view of a first advancing barrel of the zoom lens barrel.
Figure 10:
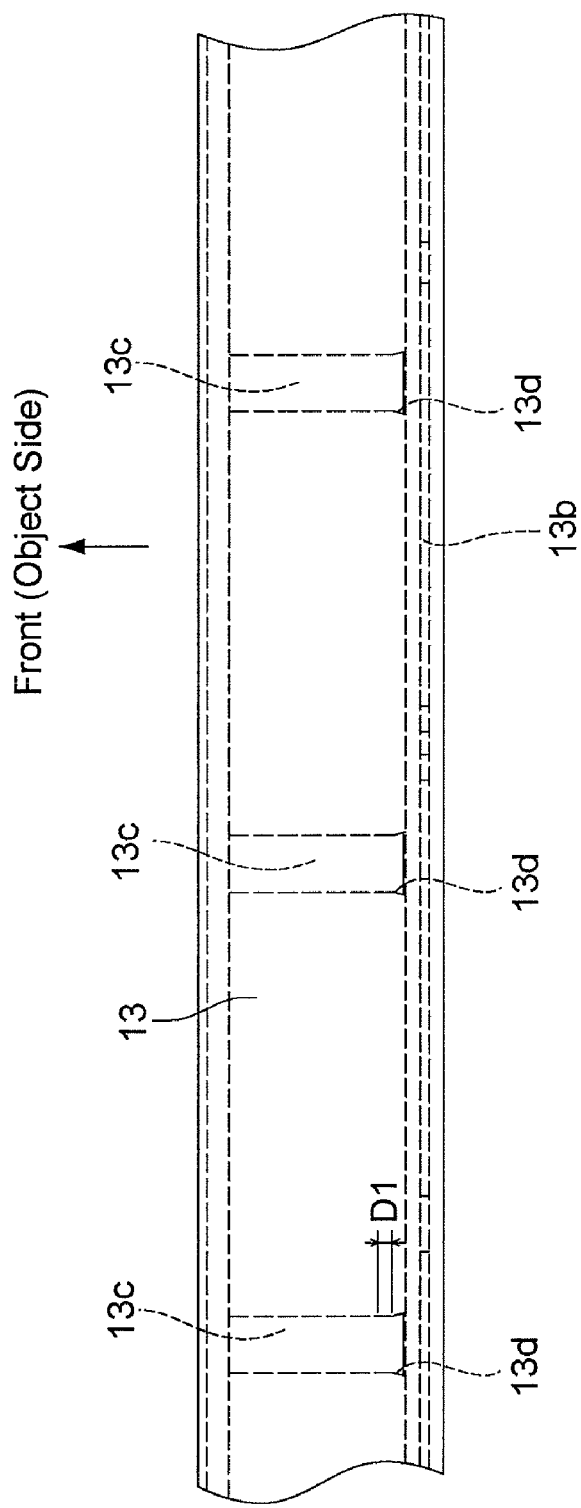
FIG. 10 is a developed view of the first advancing barrel.

As shown in FIGS. 7 and 10, the first advancing barrel 13 is provided, on an inner peripheral surface thereof at substantially equi-angular intervals in the circumferential direction thereof, with three linear guide grooves 13c. Each linear guide groove 13c is an elongated groove extending in the optical axis direction, and both ends of each linear guide groove 13c in the optical axis direction are formed as open ends. In accordance with variations in relative position between the first advancing barrel 13 and the second advancing barrel 12 in the optical axis direction, the outer linear guide keys 12a are engaged in or disengaged rearwardly from the linear guide grooves 13c, respectively, in the optical axis direction. In a state where the outer linear guide keys 12a are engaged in the linear guide grooves 13c, respectively, the second advancing barrel 12 is guided linearly in the optical axis direction by the first advancing barrel 13. Each linear guide groove 13c is provided at the rear end thereof in the optical axis direction with a flared opening 13d, the width of which gradually increases in the rearward direction. The flared openings 13d of the linear guide grooves 13c make it possible to allow the outer linear guide keys 12a which are disengaged from the linear guide grooves 13c to be smoothly inserted into the linear guide grooves 13c, respectively.

Figure 11:
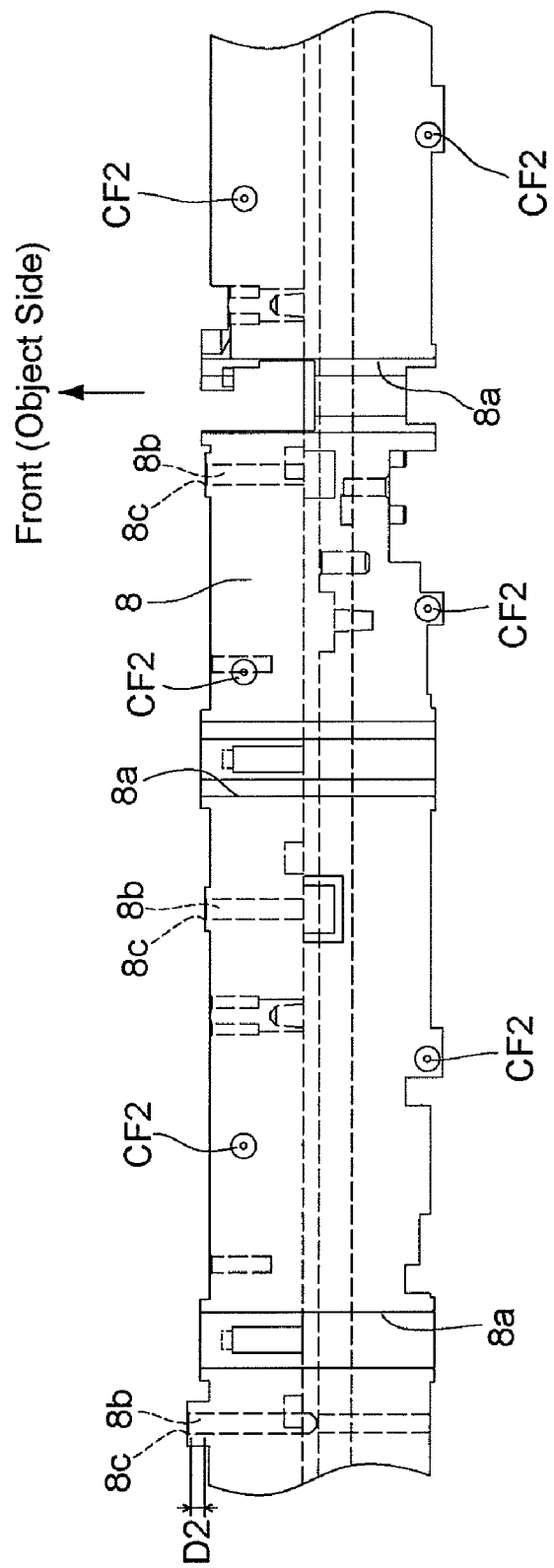
FIG. 11 is a developed view of the second lens group moving frame.

As shown in FIGS. 8 and 11, the second lens group moving ring 8 is provided, on an inner peripheral surface thereof at equi-angular intervals in the circumferential direction, with three linear guide grooves 8b. Each linear guide groove 8b is an elongated groove extending in the optical axis direction, and the front end of each linear guide groove 8b is formed as an open end. In accordance with variations in relative position between the second lens group moving frame 8 and the second advancing barrel 12 in the optical axis direction, the inner linear guide keys 12b are engaged in or disengaged forward from the linear guide grooves 8b, respectively. In a state where the inner linear guide keys 12b are engaged in the linear guide grooves 8b, respectively, the second advancing barrel 12 is guided linearly in the optical axis direction by the second lens group moving frame 8. Each linear guide groove 8b is provided at the front end thereof with a flared opening 8c, the width of which gradually increases in the forward direction. The flared openings 8c of the linear guide grooves 8b make it possible to allow the inner linear guide keys 12b, which are disengaged from the linear guide grooves 8b, to be smoothly inserted into the linear guide grooves 8b, respectively.

The second advancing barrel 12 is provided behind the outer linear guide keys 12a with three first cam followers CF1, respectively, each of which projects radially inwards. Each first cam follower CF1 is slidably engaged in an associated first-lens-group control cam groove (first cam groove) CG1 formed on an outer peripheral surface of the cam ring 11. Since the second advancing barrel 12 is guided linearly in the optical axis direction via the first advancing barrel 13 and the second lens group moving frame 8, rotation of the cam ring 11 causes the second advancing barrel 12 (i.e., the first lens group LG1) to move in the optical axis direction in a predetermined moving manner in accordance with the contours (cam profiles) of the first-lens-group control cam grooves CG1.

The second lens group moving frame 8 is provided on an outer peripheral surface thereof with a plurality of second cam followers CF2, each of which projects radially outwards to be slidably engaged in an associated second-lens-group control cam groove (second cam groove) CG2 formed on an inner peripheral surface of the cam ring 11. Since the second lens group moving frame 8 is guided linearly in the optical axis direction via the linear guide ring 10, rotation of the cam ring 11 causes the second lens group moving frame 8 (i.e., the second lens group LG2) to move in the optical axis direction in a predetermined moving manner in accordance with the contours of the second-lens-group control cam grooves CG2.

The zoom lens barrel ZL is provided between the second lens group moving frame 8 and the second advancing barrel 12 with an inter-lens-group biasing spring 27, in the form of a compression spring, which biases the second lens group moving frame 8 and the second advancing barrel 12 in opposite directions away from each other.

Figure 12:
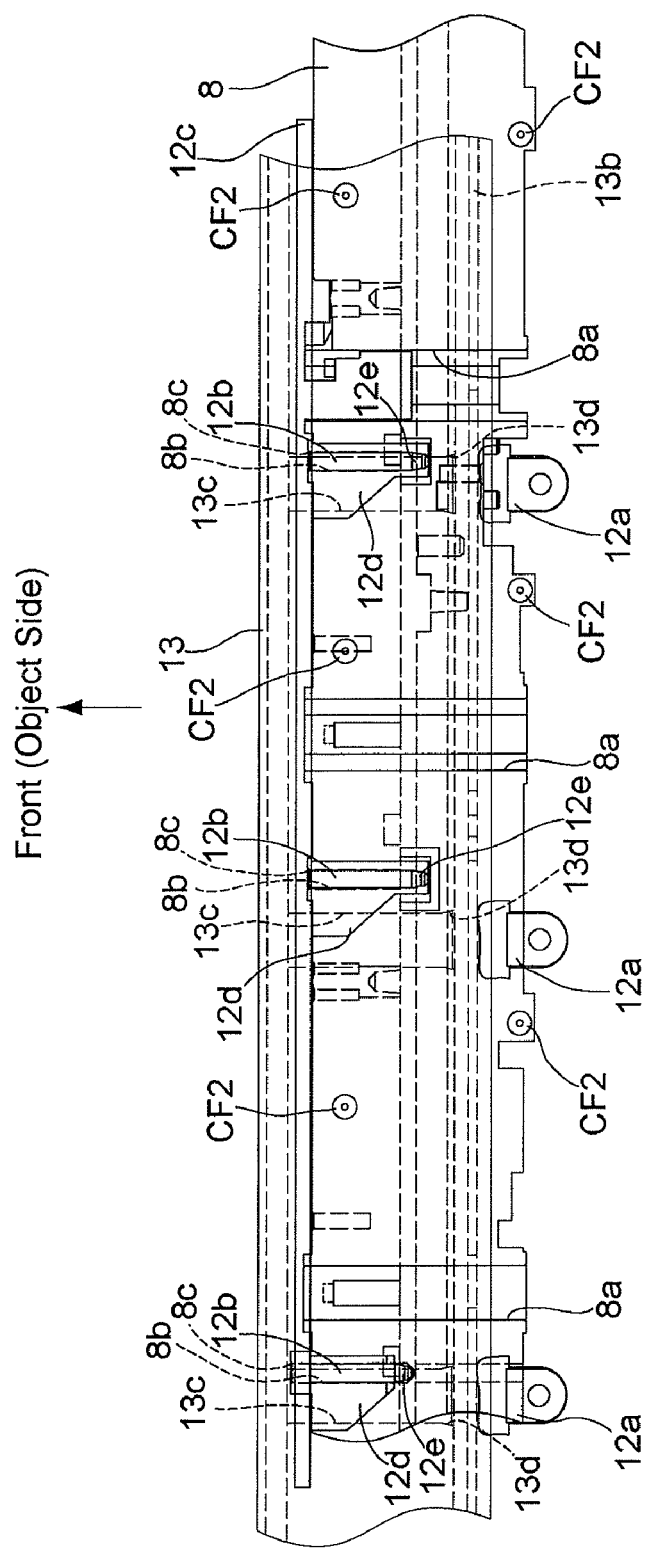
FIG. 12 is a developed view of the second advancing barrel, the first advancing barrel and the second lens group moving frame, showing the linear-guide relationship thereamong when the zoom lens barrel is in the lens barrel accommodated state.
Figure 15:
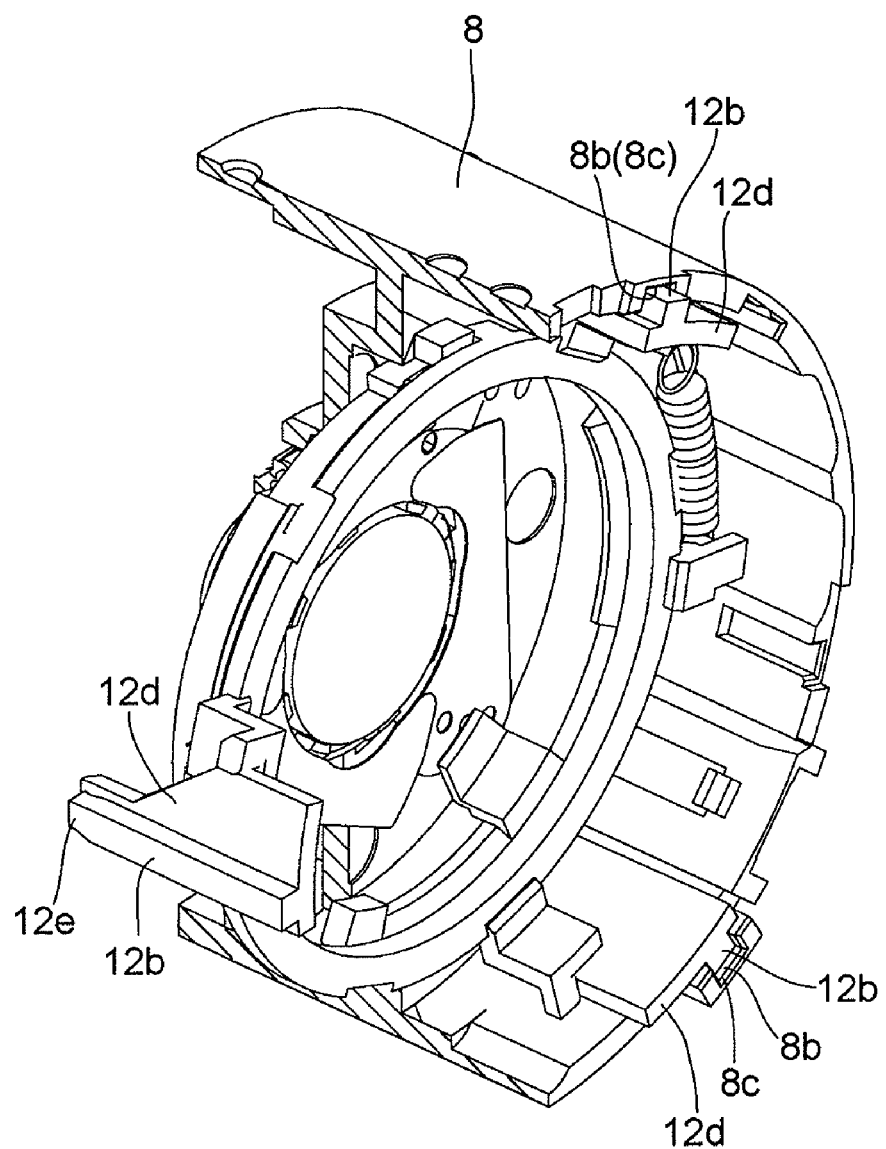
FIG. 15 is a front perspective view, partly cutaway, of elements associated with a variable aperture-stop mechanism incorporated in the zoom lens barrel, showing a state where the second lens group moving frame guides the second advancing barrel linearly in an optical axis direction.
Figure 16:
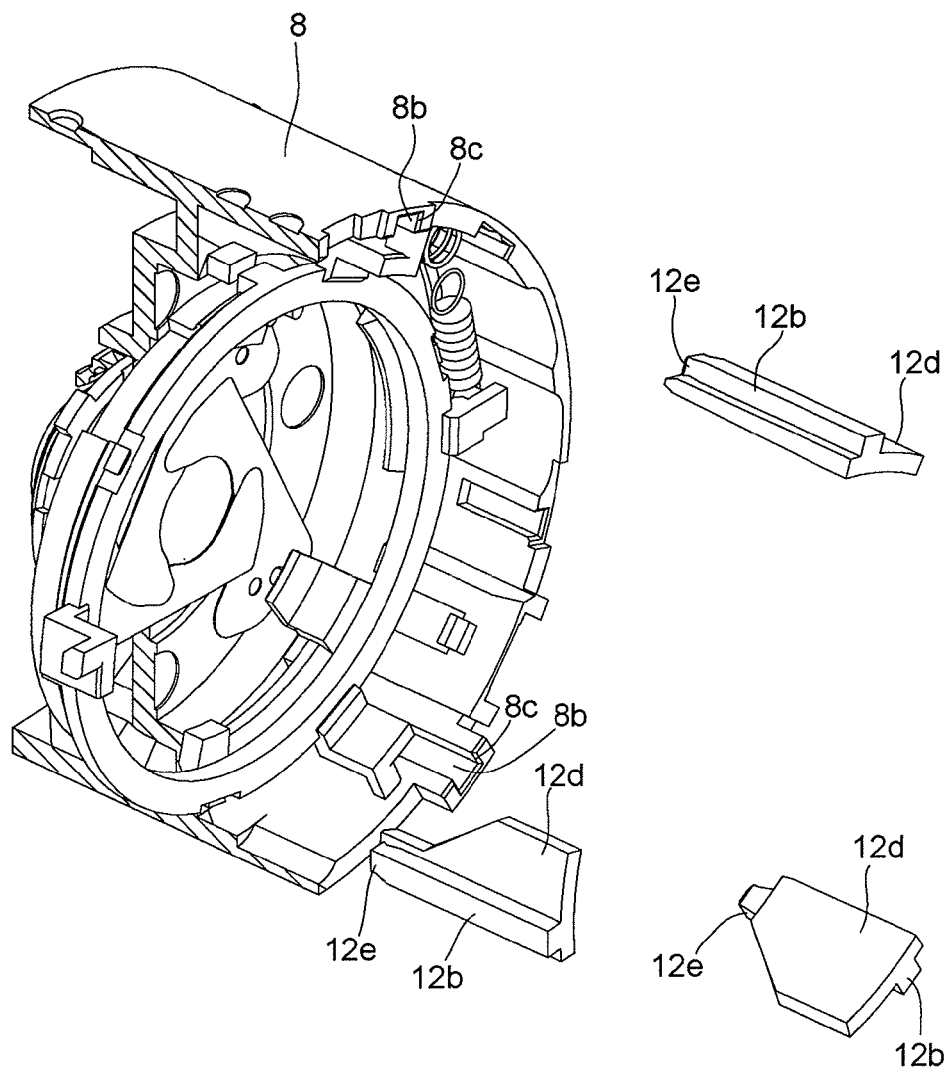
FIG. 16 is front perspective view, partly cutaway, of the elements shown in FIG. 15, showing a state where the second advancing barrel is disengaged from the second lens group moving frame, thus being released from being guided linearly in the optical axis direction by the second lens group moving frame.

Operations of the zoom lens barrel ZL that has the above described structure will be discussed hereinafter. In the lens barrel accommodated state shown in FIG. 2, the length of the optical system in the optical axis direction (the distance from the front surface of the first lens group LG1 to the imaging surface of the image sensor 26) is shorter than that in a ready-to-photograph state shown in FIG. 1. In the lens barrel accommodated state, the amount of overlap between the second lens group moving frame 8, the second advancing barrel 12 and the first advancing barrel 13 is great; and the inner linear guide keys 12b of the second advancing barrel 12 are engaged in the linear guide grooves 8b of the second lens group moving frame 8, respectively, while the outer linear guide keys 12a of the second advancing barrel 12 are disengaged rearwardly from the linear guide grooves 13c of the first advancing barrel 13, respectively, as shown in FIGS. 2, 12 and 15. Accordingly, from this lens barrel accommodated state, the second advancing barrel 12 is guided linearly in the optical axis direction with the inner linear guide keys 12b and the linear guide grooves 8b relatively sliding on each other, respectively. In other words, in the lens barrel accommodated state, the second lens group moving frame 8 guides the second advancing barrel 12 linearly in the optical axis direction, whereas the first advancing barrel 13 has no influence on the linear guidance of the second advancing barrel 12.

In the lens barrel accommodated state, immediately after a transition signal for transition from the lens barrel accommodated state to a ready-to-photograph state (e.g., turning ON a main switch of the camera in which the zoom lens barrel ZL is incorporated) is input to the zoom lens barrel ZL, the zoom motor 150 is driven in the lens barrel advancing direction, which causes the cam ring 11 to advance in the optical axis direction while rotating relative to the housing 22 due to the engagement of the plurality of guide projections 11a and the lead groove portions 22a1 of the plurality of cam-ring guide grooves 22a. The linear guide ring 10 and the first advancing barrel 13 linearly move with the cam ring 11. The rotation of the cam ring 11 causes the second advancing barrel 12, which is guided linearly in the optical axis direction via the second lens group moving frame 8, to move in the optical axis direction in a predetermined moving manner outside the cam ring 11 due to the engagement of the first cam followers CF1 with the first-lens-group control cam grooves CG1. More specifically, during this movement of the second advancing barrel 12, the second advancing barrel 12 moves forward in the optical axis direction relative to the cam ring 11. Since the cam ring 11 and the first advancing barrel 13 integrally move with each other with respect to the optical axis direction, a forward movement of the second advancing barrel 12 relative to the cam ring 11 and the first advancing barrel 13 causes the outer linear guide keys 12a to approach the linear guide grooves 13c from behind. Additionally, the rotation of the cam ring 11 causes the second lens group moving frame 8, which is guided linearly in the optical axis direction via the linear guide ring 10, to move in the optical axis direction in a predetermined moving manner (which is different from the moving manner of the second advancing barrel 12) inside the cam ring 11 due to the engagement of the second cam followers CF2 with the second-lens-group control cam grooves CG2. This movement of the second lens group moving frame 8 varies the positions of the inner linear guide keys 12*b* in the linear guide grooves 8*b*, respectively.

Figure 13:
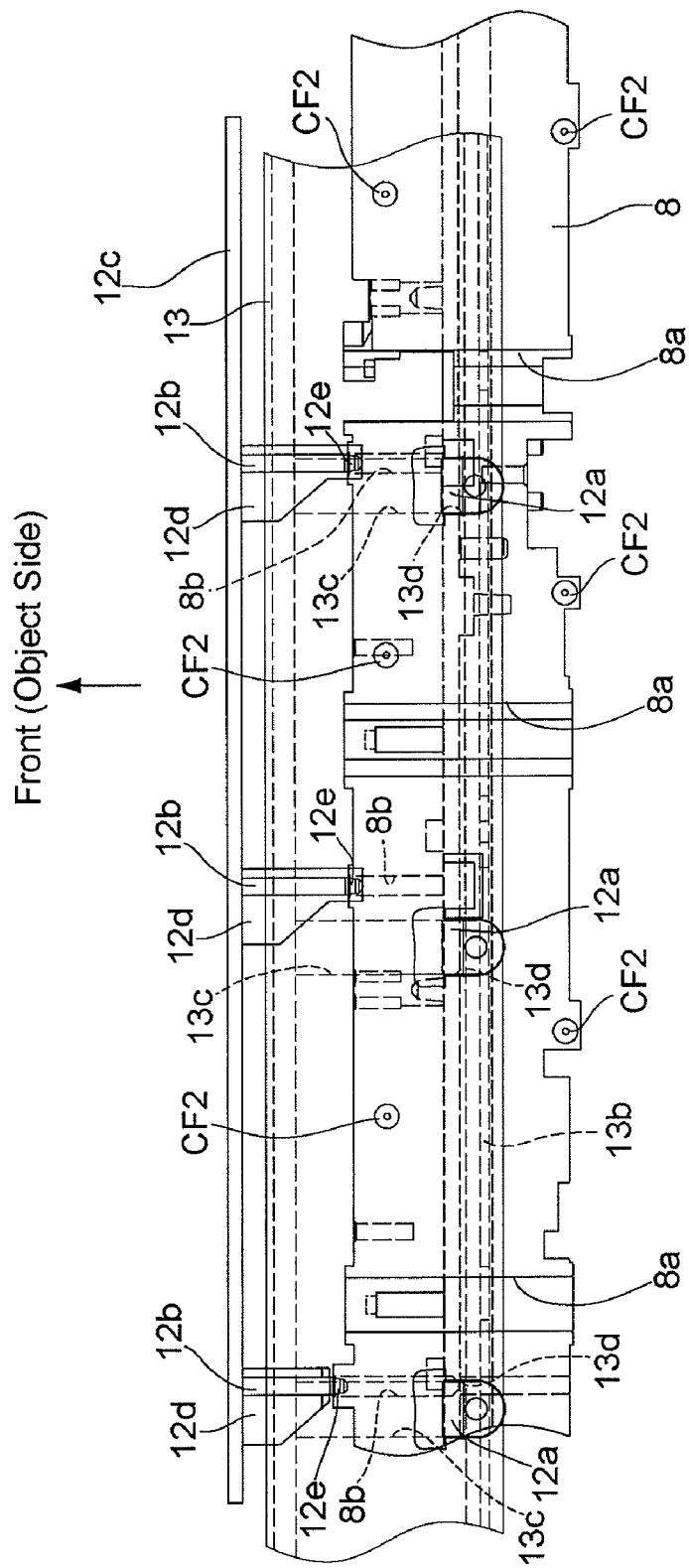
FIG. 13 is a developed view of the second advancing barrel, the first advancing barrel and the second lens group moving frame, showing a linear-guide switch operation (linear-guide transfer operation) within the same linear-guide relationship.

Driving of the zoom motor 150 in the lens barrel advancing direction by a predetermined amount from the lens barrel accommodated state causes the outer linear guide keys 12*a* to enter the linear guide grooves 13*c* from the rear ends thereof, respectively, as shown in FIG. 13. At this time, due to the shapes of the flared openings 13*d* of the linear guide grooves 13*c*, the outer linear guide keys 12*a* can be smoothly inserted into the linear guide grooves 13*c*, respectively, without catching on the ends of the linear guide grooves 13*c*. In addition, in the state shown in FIG. 13, a major part of each inner linear guide key 12*b* is disengaged forwardly from the associated linear guide groove 8*b*, and only the tapered end 12*e* of each inner linear guide key 12*b* is positioned in the vicinity of the flared opening 8*c* of the associated linear guide groove 8*b*, so that the linear guidance by the engagement of the inner linear guide keys 12*b* with the linear guide grooves 8*b* is substantially cancelled (nullified). Accordingly, the two linear guide members, i.e., the second lens group moving frame 8 and the first advancing barrel 13, which serve as guide members for guiding the second advancing barrel 12 linearly in the optical axis direction, have been switched from a state where the second lens group moving frame 8 undertakes the linear guidance of the second advancing barrel 12 in the optical axis direction to a state where the first advancing barrel 13 undertakes the linear guidance of the second advancing barrel 12 in the optical axis direction. The timing of this switching operation is predetermined so that the inner linear guide keys 12*b* are disengaged from the linear guide grooves 8*b* after the outer linear guide keys 12*a* engage in the linear guide grooves 13*c*, i.e., so that the inner linear guide keys 12*b* and the outer linear guide keys 12*a* are not simultaneously disengaged from the linear guide grooves 8*b* and the linear guide grooves 13*c*, respectively. More specifically, there exists a state in which each outer linear guide key 12*a* and each inner linear guide key 12*b* are simultaneously engaged in a portion D1 of the associated linear guide groove 13*c* in the vicinity of the rear end thereof (see FIG. 10) and a portion D2 of the associated linear guide groove 8*b* in the vicinity of the front end thereof (see FIG. 11), respectively, immediately before the zoom lens barrel ZL moves into the state shown in FIG. 13 in the lens barrel advancing operation of the zoom lens barrel ZL. In other words, in the movement range of the second advancing barrel 12 in the optical axis direction, a first portion of this movement range in which the second advancing barrel 12 is guided linearly in the optical axis direction by the first advancing barrel 13 (the linear guide grooves 13*c*) and a second portion of the same movement range in which the second advancing barrel 12 is guided linearly in the optical axis direction by the second lens group moving frame 8 (the linear guide grooves 8*b*) overlap each other, and the two members (the second lens group moving frame 8 and the first advancing barrel 13) that undertake the linear guidance of the second advancing barrel 12 in the optical axis direction are switched from one to the other within this overlapping portion between the first and second portions of this movement range. With this linear guide structure, when the second lens group moving frame 8 and the first advancing barrel 13 are switched from and to a state where the second lens group moving frame 8 undertakes the linear guidance of the second advancing barrel 12 in the optical axis direction and to and from a state where the first advancing barrel 13 undertakes the linear guidance of the second advancing barrel 12 in the optical axis direction, the linear guide operation for the second advancing barrel 12 is not discontinued, which makes it possible to achieve a smooth linear guide operation.

Further driving of the zoom motor 150 from the state shown in FIG. 13 causes the second advancing barrel 12 to move forward relative to both the cam ring 11 and the first advancing barrel 13, thus causing the outer linear guide keys 12*a* to be inserted further into the linear guide grooves 13*c*, respectively. On the other hand, this driving of the zoom motor 150 causes the second advancing barrel 12 to move forward relative to the second lens group moving frame 8, thus causing the inner linear guide keys 12*b* to be totally disengaged forwardly from the linear guide grooves 8*b*, respectively (see FIGS. 14 and 16). Thereafter, upon advancing by a certain moving amount, the zoom lens barrel ZL reaches the wide-angle extremity of the zooming range shown in the upper half of the cross sectional view in FIG. 1. Once the zoom lens barrel ZL reaches the zooming range, the plurality of guide projections 11*a* are positioned in the semi-circumferential groove portions 22*a*2 of the plurality of cam-ring guide grooves 22*a*, respectively, so that no movement of the cam ring 11 in the optical axis direction occurs.

The amount of advancement of the first lens group LG1 from the lens barrel accommodated state is determined by the sum of the amount of forward movement of the cam ring 11 relative to the housing 22 and the amount of advancement of the second advancing barrel 12 relative to the cam ring 11, and the amount of advancement of the second lens group LG2 from the lens barrel accommodated state is determined by the sum of the amount of forward movement of the cam ring 11 relative to the housing 22 and the amount of advancement of the second lens group moving frame 8 relative to the cam ring 11. A zooming operation is carried out by moving the first lens group LG1 and the second lens group LG2 along the optical axis O while changing the air distance therebetween. Further driving the zoom motor 150 in the lens barrel advancing direction (toward the telephoto extremity), i.e., in the same direction as that in which the zoom lens barrel ZL is advanced from the lens barrel accommodated state, causes the zoom lens barrel ZL to move to the telephoto extremity as shown in the lower half of the cross sectional view in FIG. 1. In the zooming range between the wide-angle extremity and the telephoto-extremity, the cam ring 11 rotates at a fixed position while being guided by the semi-circumferential groove portions 22*a*2 of the plurality of cam-ring guide grooves 22*a*, thus not moving either forward or rearward in the optical axis direction.

Figure 14:
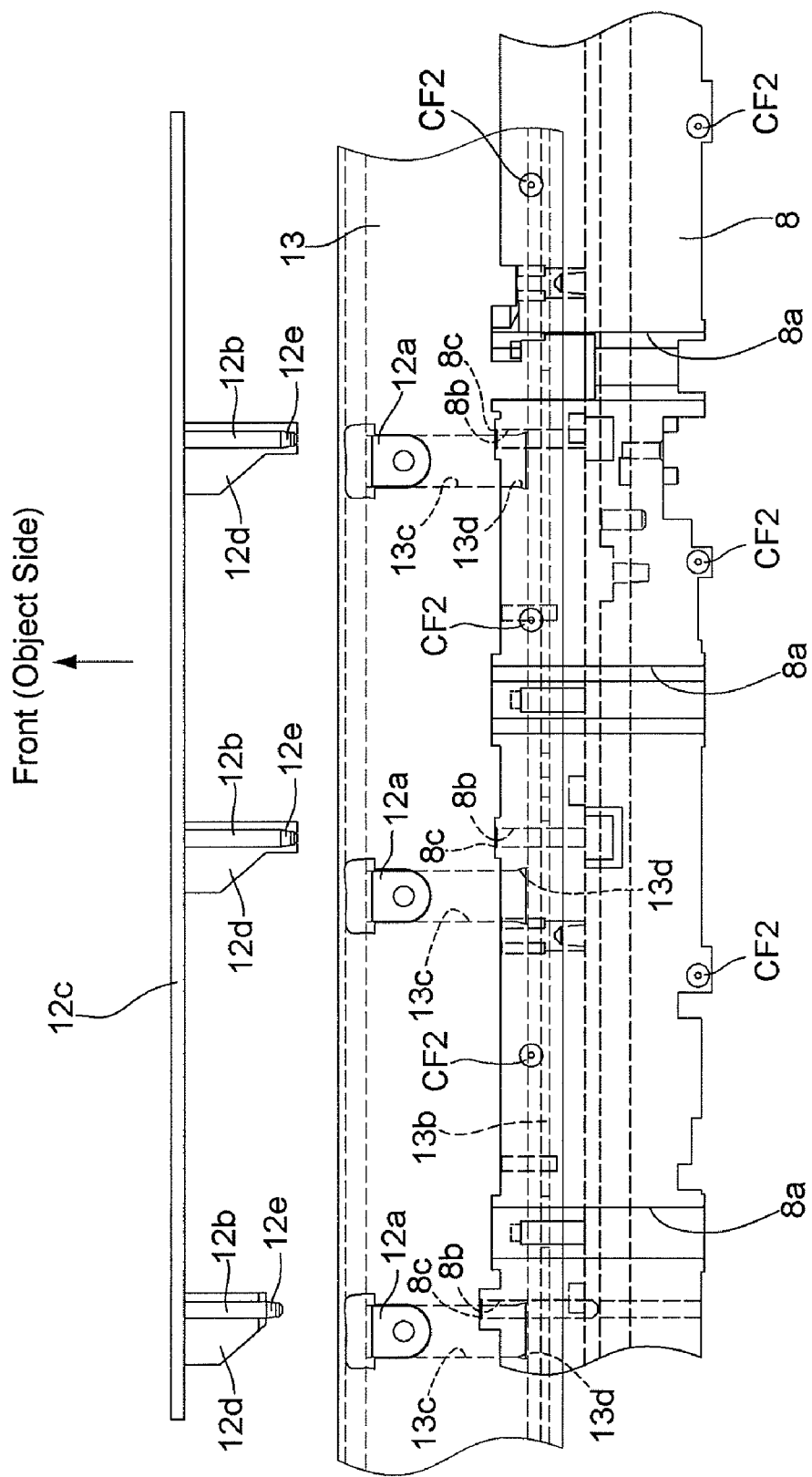
FIG. 14 is a developed view of the second advancing barrel, the first advancing barrel and the second lens group moving frame, showing the same linear-guide relationship when the zoom lens barrel is set at the wide-angle extremity in the zooming range.

As can be seen in the upper half of the cross sectional view in FIG. 1 and in FIG. 14, when the zoom lens barrel ZL is set at the wide-angle extremity, the outer linear guide keys 12*a* are engaged in the linear guide grooves 13*c* to be guided linearly in the optical axis direction, respectively, whereas the inner linear guide keys 12*b* are disengaged forwardly from the linear guide grooves 8*b*, respectively. Additionally, the state where the second advancing barrel 12 is guided linearly in the optical axis direction by the engagement of the outer linear guide keys 12*a* with the linear guide grooves 13*c* is maintained not only when the zoom lens barrel ZL is at the wide-angle extremity but also when the zoom lens barrel ZL is at the telephoto extremity (shown in the lower half of the cross sectional view in FIG. 1). The engagement of the outer linear guide keys 12*a* with the linear guide grooves 13*c* is maintained over the entire zooming range shown in FIG. 1 that includes both the wide-angle extremity and the telephoto extremity. In other words, in the zooming range, the second advancing barrel 12 is guided linearly in the optical axis direction by the first advancing barrel 13 at all times. As shown in the lower half of the cross sectional view in FIG. 1, at the telephoto extremity of the zoom lens barrel ZL, the inner linear guide keys 12b are also engaged in the linear guide grooves 8b, respectively, in association with the operation of bringing the second lens group LG2 close to the first lens group LG1. In this state, to prevent the second lens group moving frame 8 from interfering with the linear guide of the second advancing barrel 12 by the first advancing barrel 13, the clearance between each inner linear guide key 12b and the associated linear guide groove 8b is predetermined to be slightly greater than the clearance between each outer linear guide key 12a and the associated linear guide groove 13c.

Immediately after a transition signal for transition from a ready-to-photograph state (in the zooming range) to the lens barrel accommodated state (e.g., for turning OFF the aforementioned main switch of the camera in which the zoom lens barrel ZL is incorporated) is input to the zoom lens barrel ZL, the zoom motor 150 is driven in the lens barrel retracting direction, which causes the zoom lens barrel ZL to perform a lens barrel retracting operation reverse to the above described lens barrel advancing operation. At the wide-angle extremity of the zoom lens barrel ZL, the outer linear guide keys 12a are engaged in the linear guide grooves 13c, respectively, while the inner linear guide keys 12b are disengaged from the linear guide grooves 8b, respectively; however, the outer linear guide keys 12a are disengaged rearward from the linear guide grooves 13c, respectively, while the inner linear guide keys 12b are engaged in the linear guide grooves 8b, respectively, during the middle of the lens barrel retracting operation of the zoom lens barrel ZL (more specifically, upon the lens barrel retracting operation being performed from the position shown in FIG. 13). At this time, similar to the operation of the zoom lens barrel ZL when the lens barrel advancing operation is performed, the aforementioned first portion of the movement range of the second advancing barrel 12 in the optical axis direction, in which the second advancing barrel 12 is guided linearly in the optical axis direction by the first advancing barrel 13, and the aforementioned second portion of the same movement range, in which the second advancing barrel 12 is guided linearly in the optical axis direction by the second lens group moving frame 8, overlap each other so that the outer linear guide keys 12a are disengaged from the linear guide grooves 13c after the inner linear guide keys 12b engage in (enter) the linear guide grooves 8b. Due to this structure, the state of the second advancing barrel 12 is switched from a state of being guided linearly in the optical axis direction by the first advancing barrel 13 to a state where a state of being guided linearly in the optical axis direction by the second lens group moving frame 8. In this linear guide switching operation, the inner linear guide keys 12b can be smoothly inserted into the linear guide grooves 8b without catching on the ends of the linear guide grooves 8b, respectively, due to the clearance provided between the tapered end 12e of each inner linear guide key 12b and the associated flared openings 8c. Thereupon, until the lens barrel advancing operation is performed again, the second advancing barrel 12 is guided linearly in the optical axis direction by the second lens group moving frame 8, and the first advancing barrel 13 has no influence on the linear guidance of the second advancing barrel 12.

The third lens group frame 51 that supports the third lens group LG3 can be moved forward and rearward in the optical axis direction by the AF motor 160 independently of the above described driving operations of the first lens group LG1 and the second lens group LG2 that are performed by the zoom motor 150. In addition, when the photographing optical system of the zoom lens barrel ZL is in the zooming range from the wide-angle extremity to the telephoto extremity, the third lens group LG3 is moved in the optical axis direction to perform a focusing operation by driving the AF motor 160 in accordance with object distance information obtained by a distance measuring device (not shown) provided, e.g., in the camera in which the zoom lens barrel ZL is incorporated.

As can be understood from the above descriptions, in the present embodiment of the zoom lens barrel ZL, the linear guidance of second advancing barrel 12 in the optical axis direction is shared between two members (two partial linear guide members) having different linear guiding ranges, i.e., the first advancing barrel 13 and the second lens group moving frame 8, which include the linear guide grooves 13c and the linear guide grooves 8b, respectively, and these two partial linear guide members (the first partial linear guide member and the second partial linear guide member) are configured to serve as a single linear guide mechanism for guiding the second advancing barrel 12 linearly in the optical axis direction by making these two partial linear guide members function complementarily with each other. With this structure, the linear guiding amount in the optical axis direction which is undertaken by the linear guide grooves 13c (i.e., the length of each linear guide groove 13c in the optical axis direction) and the linear guiding amount in the optical axis direction which is undertaken by the linear guide grooves 8b (i.e., the length of each linear guide groove 8b in the optical axis direction) can be smaller than the maximum amount (length) of movement of the second advancing barrel 12 in the optical axis direction; and accordingly, the first advancing barrel 13 and the second lens group moving frame 8 can be made smaller in size (length) than the movement range of the second advancing barrel 12 in the optical axis direction. In other words, the second advancing barrel 12 can be given a wider range of movement in the optical axis direction with no restriction of the size of each of the first advancing barrel 13 and the second lens group moving frame 8 in the optical axis direction. The second advancing barrel 12 holds the first lens group LG1, so that, e.g., the zoom ratio of the zoom lens barrel ZL can be increased by increasing the range of movement of the second advancing barrel 12 in the optical axis direction. Additionally, the length of the zoom lens barrel ZL in the lens barrel accommodated state (shown in FIG. 2) can be reduced by making the first advancing barrel 13 and/or the second lens group moving frame 8 smaller in size than the range of movement of the second advancing barrel 12 in the optical axis direction. Namely, the amount of advancement of the second advancing barrel 12 (the first lens group LG1) can be increased though the zoom lens barrel ZL is compact in size in the optical axis direction.

Although the present invention has been discussed with reference to the above described embodiment, the present invention is not limited to this particular embodiment. For instance, in the above described embodiment, when the zoom lens barrel ZL moves to a ready-to-photograph state from the lens barrel accommodated state, the cam ring 11 advances in the optical axis direction while rotating relative to the housing 22. This structure makes it possible to achieve a large amount of advancement of each of the first lens group LG1 and the second lens group LG2, which are supported indirectly by the cam ring 11, relative to the image plane (the image sensor 26). However, even in the case where the zoom lens barrel ZL is structured so that the cam ring 11 rotates at a fixed position, without moving in the optical axis direction at all times unlike the present embodiment, the above described effect in which the amount of advancement of the second advancing barrel 12 can be made larger than the size of each of the first advancing barrel 13 (the linear guide grooves 13c) and the second lens group moving frame 8 (the linear guide grooves 8b) in the optical axis direction can be obtained. Accordingly, the present invention is effective also for a type of lens barrel in which a rotatable ring which corresponds to the cam ring 11 does not move in the optical axis direction.

Although the second advancing barrel 12 is guided linearly in the optical axis direction by the two partial linear guide members, i.e., the first advancing barrel 13 and the second lens group moving frame 8 in the above described embodiment of the zoom lens barrel, it is possible for a single linearly movable member such as the second advancing barrel 12 to be guided linearly in the optical axis direction by more than two partial linear guide members.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A linear guide mechanism of a lens barrel, said lens barrel including a rotatable ring, and a linearly movable member which holds an optical element and moves linearly in an optical axis direction by rotation of said rotatable ring, said linear guide mechanism comprising:
    first and second partial linear guide members each of which linearly guide said linearly movable member in said optical axis direction,
    wherein a movement range of said linearly movable member in said optical axis direction is divided into a plurality of different movement ranges, including:
    a first movement range in which said linearly movable member is linearly guided in the optical axis direction by said first partial linear guide member and is disengaged from guidance by said second partial linear guide member,
    a second movement range in which said linearly movable member is linearly guided in the optical axis direction by said second partial linear guide member and is disengaged from guidance by said first partial linear guide member, and
    a third movement range in which said linearly movable member is linearly guided in the optical axis direction by both of said first and second partial linear guide members.

2. The linear guide mechanism according to claim 1, wherein said rotatable ring comprises a cam ring provided with a first cam groove and a second cam groove which have mutually different cam profiles,
    wherein said linearly movable member comprises a cam follower which is engaged in said first cam groove of said cam ring,
    wherein said first partial linear guide member is coupled to said cam ring in a manner to be prevented from moving relative to said cam ring in said optical axis direction and to allow said cam ring to rotate relative to said first partial linear guide member,
    wherein said second partial linear guide member holds another optical element which is different from said optical element that said linearly movable member holds, and
    wherein said second partial linear guide member includes a cam follower which is engaged in said second cam groove of said cam ring so that said second partial linear guide member is moved linearly in said optical axis direction in a moving manner different from that of said first partial linear guide member in accordance with a rotation of said cam ring.

3. The linear guide mechanism according to claim 1, wherein said rotatable ring advances in said optical axis direction while rotating relative to a stationary barrel when said lens barrel moves from a lens barrel accommodated state to a ready-to-photograph state, and
    wherein said first partial linear guide member is guided linearly in said optical axis direction by a linear guide provided on said stationary barrel.

4. The linear guide mechanism according to claim 1, further comprising an intermediate linear guide member which is guided linearly in said optical axis direction by a linear guide provided on a stationary barrel, and
    wherein said second partial linear guide member is guided linearly in said optical axis direction by said intermediate linear guide member.

5. The linear guide mechanism according to claim 1, wherein said linearly movable member and said first partial linear guide member are provided as two external barrels of said lens barrel, respectively, one of which is positioned over the other, and
    wherein an amount of overlap between said two external barrels varies in accordance with said rotation of said cam ring.

6. The linear guide mechanism according to claim 1, wherein each of said first and second partial linear guide members includes a linear guide groove, at least one end of which in said optical axis direction is formed as an open end, and
    wherein said linearly movable member comprises a plurality of kinds of linear guide keys which are engaged in and disengaged from respective said linear guide grooves of respective said partial linear guide members via respective said open ends.

7. The linear guide mechanism according to claim 6, wherein at least one of said open ends of said linear guide grooves is shaped into a flared opening, the width of which gradually increases.

8. The linear guide mechanism according to claim 6, wherein at least one of said linear guide keys comprises a tapered insertion end for inserting into said open end of associated one of said linear guide grooves.

9. The linear guide mechanism according to claim 1, wherein said first and second partial linear guide members and said linearly movable member are concentrically arranged about said optical axis.

10. A linear guide mechanism of a lens barrel, said lens barrel including a rotatable ring, and a linearly movable member which holds an optical element and moves linearly in an optical axis direction by rotation of said rotatable ring, said linear guide mechanism comprising:
    a first partial linear guide member, which guides said linearly movable member linearly in said optical axis direction when said lens barrel is in a ready-to-photograph state; and
    a second partial linear guide member, which guides said linearly movable member linearly in said optical axis direction when said lens barrel is in a lens barrel accommodated state in which no picture taking operation is performed;
    wherein:
    a movement range of said linearly movable member in said optical axis direction is shared by a plurality of different movement ranges, via which said linearly movable member is linearly guided in the optical axis direction by said first and second linear guide members, respectively, and during a transition of said lens barrel from said lens barrel accommodated state to said ready-to-photograph state, a linear guiding operation of said second partial linear guide member for said linearly movable member is canceled and a linear guiding operation of said first partial linear guide member for said linearly movable member commences.

11. The linear guide mechanism according to claim 10, wherein, when said lens barrel moves from said lens barrel accommodated state to said ready-to-photograph state, said linear guiding operation of said first partial linear guide member for said linearly movable member commences before said linear guiding operation of said second partial linear guide member for said linearly movable member is canceled.

12. The linear guide mechanism according to claim 10, wherein said optical element serves as an element of a zoom lens optical system, and wherein said first partial linear guide member guides said linearly movable member linearly in said optical axis direction over an entire zooming range from a wide-angle extremity to a telephoto extremity of said zoom lens optical system.

13. The linear guide mechanism according to claim 10, wherein said rotatable ring advances in said optical axis direction while rotating relative to a stationary barrel when said lens barrel moves from said lens barrel accommodated state to said ready-to-photograph state, and wherein said first partial linear guide member is guided linearly in said optical axis direction by a linear guide provided on said stationary barrel.

14. The linear guide mechanism according to claim 10, wherein said rotatable ring comprises a cam ring provided with a first cam groove and a second cam groove which have mutually different cam profiles, wherein said linearly movable member comprises a cam follower which is engaged in said first cam groove of said cam ring, wherein said first partial linear guide member is coupled to said cam ring in a manner to be prevented from moving relative to said cam ring in said optical axis direction and to allow said cam ring to rotate relative to said first partial linear guide member, wherein said second partial linear guide member holds another optical element which is different from said optical element that said linearly movable member holds, and wherein said second partial linear guide member includes a cam follower which is engaged in said second cam groove of said cam ring so that said second partial linear guide member is moved linearly in said optical axis direction in a moving manner different from that of said first partial linear guide member in accordance with a rotation of said cam ring.

15. The linear guide mechanism according to claim 14, further comprising an intermediate linear guide member which is guided linearly in said optical axis direction by a linear guide provided on a stationary barrel, and wherein said second partial linear guide member is guided linearly in said optical axis direction by said intermediate linear guide member.

16. The linear guide mechanism according to claim 14, wherein said linearly movable member and said first partial linear guide member are provided as two external barrels of said lens barrel, respectively, one of which is positioned over the other, and wherein an amount of overlap between said two external barrels varies in accordance with said rotation of said cam ring.

17. The linear guide mechanism according to claim 10, wherein each of said plurality of partial linear guide members includes a linear guide groove, at least one end of which in said optical axis direction is formed as an open end, and wherein said linearly movable member comprises a plurality of linear guide keys which are engaged in and disengaged from respective said linear guide grooves of respective said partial linear guide members via respective said open ends.

18. The linear guide mechanism according to claim 17, wherein at least one of said open ends of said linear guide grooves is shaped into a flared opening, the width of which gradually increases.

19. The linear guide mechanism according to claim 17, wherein at least one of said linear guide keys comprises a tapered insertion end for inserting into said open end of associated one of said linear guide grooves.

20. The linear guide mechanism according to claim 10, wherein said plurality of partial linear guide members and said linearly movable member are concentrically arranged about said optical axis.

* * * * *